(12) United States Patent
Greenwald et al.

(10) Patent No.: US 7,181,641 B2
(45) Date of Patent: Feb. 20, 2007

(54) DATA STORAGE VERIFICATION TECHNIQUES FOR DISK DRIVERS

(75) Inventors: Robert Greenwald, Santa Cruz, CA (US); William Stubkjaer, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 467 days.

(21) Appl. No.: 10/671,032

(22) Filed: Sep. 24, 2003

(65) Prior Publication Data

US 2005/0066237 A1   Mar. 24, 2005

(51) Int. Cl.
  G06F 11/00   (2006.01)
(52) U.S. Cl. .................. 714/5; 714/6; 714/42
(58) Field of Classification Search ............ 714/5, 714/6, 42
  See application file for complete search history.

(56) References Cited

U.S. PATENT DOCUMENTS

| 5,889,937 | A | | 3/1999 | Tamagawa |
| 6,061,822 | A | * | 5/2000 | Meyer ..................... 714/758 |
| 2002/0095623 | A1 | * | 7/2002 | Bruce ..................... 714/42 |

OTHER PUBLICATIONS

Null, Linda: "Computer Organization and Architecture." Copyright 2003. Jones and Barlett Publishers. pp. 293-294.*

KC Abshere, Joel Camp, Chris Karr, "Applications of the Rules of Life in Real World Scenarios", New Mexico High School Supercomputing Challenge, Apr. 9, 1997, 11 pages.
The GNU C Library, "Pseudo-Random Numbers", Jul. 6, 2001, 2 pages.
EPOS Ltd., "EPOS Tester HDD—Device for HDD maintenance", Mar. 15, 2002, 4 pages.
Tom Dickens, "Random Number Generation for Microcontrollers", Robothon 2003, 3 pages.

* cited by examiner

Primary Examiner—Robert Beausoliel
Assistant Examiner—Matthew Urick
(74) Attorney, Agent, or Firm—Townsend and Townsend and Crew LLP

(57) ABSTRACT

Techniques are provided for verifying the integrity of data written onto a memory device under test. A pseudo random number generator generates data patterns based on a known 'seed' that includes a date and time. A data storage system writes the data patterns onto the memory device under test and a reference drive. The data storage system then reads the data patterns from the memory device under test and the reference drive. Alternatively, the seed value is stored in the second memory device instead of the data pattern, and subsequently, the data storage system reads the seed value from the second memory device and regenerates the data pattern. The expected data patterns from the reference drive are compared to the data read from the memory device under test to verify whether the data storage system is operating properly.

21 Claims, 1 Drawing Sheet

DATA STORAGE VERIFICATION TECHNIQUES FOR DISK DRIVERS

BACKGROUND OF THE INVENTION

The present invention relates to techniques for verifying data stored on data storage media, and more particularly, to techniques for verifying that a data storage system correctly writes data onto a memory device.

A disk drive writes data onto a data storage disk such as a magnetic hard disk. A disk drive typically uses a head to read and write data from/onto the disk. Many types of defects can be introduced into a disk drive system during the design and manufacturing process. Some of these defects can cause the disk drive to write erroneous data or no data at all onto a magnetic disk.

For example, often the firmware that controls the functionality of the disk drive contains bugs. Some types of bugs can cause a disk drive to write erroneous data onto a magnetic disk. As another example, the disk drive hardware can contain hardware defects. Some types of hardware defects can also cause the disk drive to write erroneous data onto a magnetic disk.

Therefore, it would be desirable to provide techniques for testing a data storage system to determine whether it correctly writes data onto a memory device before the data storage system is released to production.

BRIEF SUMMARY OF THE INVENTION

The present invention provides techniques for verifying the integrity of data written onto a memory device. Systems and methods of the present invention can test a data storage system prior to production to determine whether the data storage system correctly writes data onto the memory device.

A pseudo random number generator generates a data pattern that is based on a known 'seed' value. The seed value includes the current date and time. The data storage system then writes the data pattern onto the memory device under test. If the write process is successful, the writes the data pattern onto the memory device under test. If the write process is successful, the data pattern is stored on a second memory device at a location that corresponds to the logical block address (LBA) of the sector that the data pattern was stored in the memory device under test. Alternatively, the seed value is stored in the second memory device at the correspond LBA instead of the data pattern.

Subsequently, the data storage system retrieves the data pattern from the second memory device. Alternatively, the data storage system reads the seed value from the second memory device and regenerates the data pattern. This data pattern is the data that the data storage system expects to read from the memory device under test at the corresponding LBA.

The data storage system reads the data pattern from the memory device under test at the corresponding LBA. The expected data pattern is compared to the data that was read from the memory device under test. From this comparison, the present invention can verify whether the data storage system correctly writes data onto the memory device under test.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
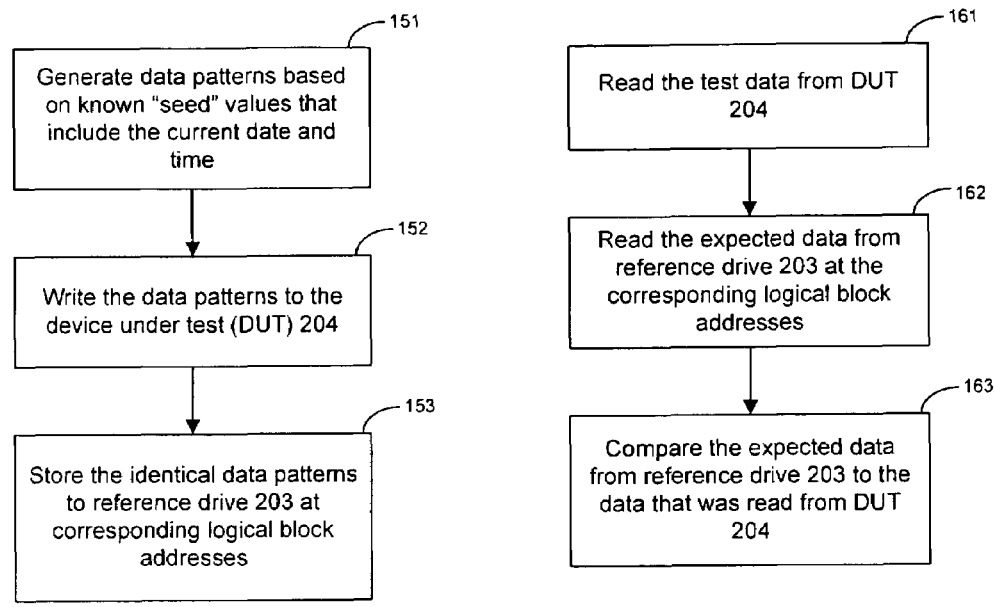
FIG. 1 are flow charts that illustrate a process for verifying the integrity of data written onto a memory device under test according to embodiments of the present invention.

FIG. 1 illustrates flow charts that outline embodiments of the present invention. The process of FIG. 1 involves a data storage system that writes test data patterns onto a memory device under test (DUT), reads the test data pattern from the memory device, and compares the test data pattern read from the memory device to expected values. The process of FIG. 1 includes write and read commands.

Figure 2:
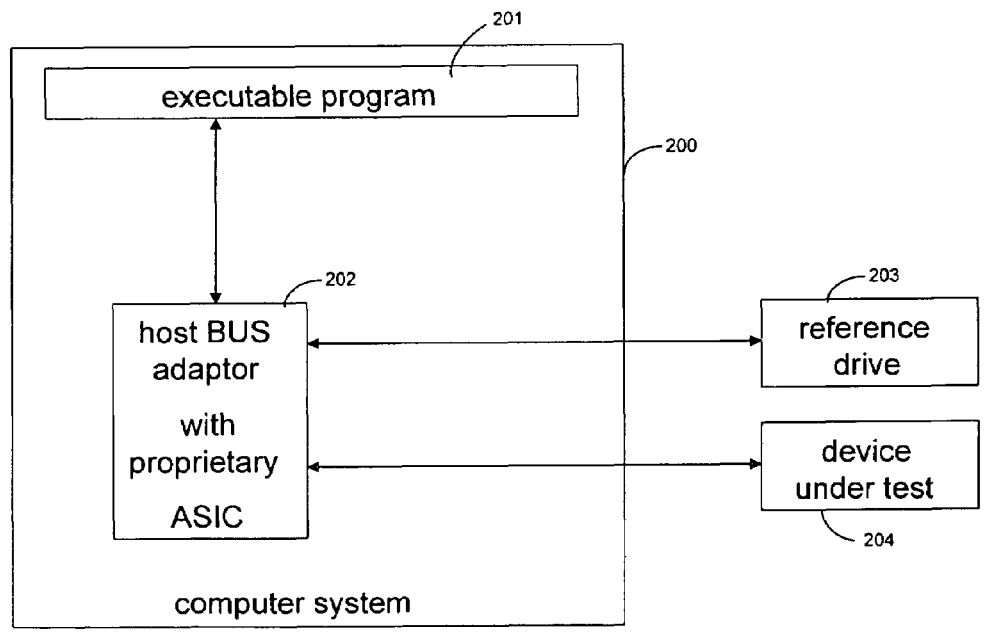
FIG. 2 illustrates a data storage system that verifies the integrity of data written onto a memory device under test according to an embodiment of the present invention.

FIG. 2 illustrates a computer data storage system 200 that can verify the integrity of data written onto a memory device according to an embodiment of the present invention. Computer data storage system 200 can be any type of data storage device, such as, a magnetic disk drive system, an optical disk drive system, a semiconductor memory device such as SRAM, a magnetic tape storage device, etc.

Computer system 200 includes a host bus adaptor 202 and an executable program 201. Executable program 201 performs many of the functions discussed below with respect to FIG. 1. Executable program 201 can be run on a processor or a controller associated with adaptor 202.

The DUT 204 is a memory device such as a magnetic hard disk or an optical disk. Reference drive 203 is a secondary memory device that is discussed in further detail below. System 200 can write data to and read data from DUT 204 and reference drive 203.

Adaptor 202 communicates with reference drive 203 and memory device under test (DUT) 204 as shown in FIG. 2. Host bus adaptor 202 can include an application specific integrated circuit (ASIC) controller that communicates with these devices.

The controller in HBA 202 is hardware that acts to make reference drive 203 become a "mirror" of DUT 204. HBA 202 always writes data requested to be written to DUT 204 at a particular LBA, to a corresponding LBA on reference drive 203 also. Also, whenever reading data from DUT 204, a corresponding read is initiated on reference drive 203, so that the data read from DUT 204 can be compared to the data read from drive 203.

Referring again to FIG. 1, system 200 of the present invention generates data patterns based on known seed values at step 151. The data patterns are generated using a pseudo random number generator. Any pseudo random number generator can be used to generate a data pattern. The data pattern is a sequence of randomly generated numbers.

A pseudo random number generator is a type of algorithm that generates a sequence of random numbers based on a seed value. The algorithm can regenerate the exact same sequence of numbers multiple times by using the same seed value that was used to generate the first random number sequence. Because the exact same sequence of numbers can be generated multiple times based on the same seed value, the random number generator is classified as a pseudo random number generator.

Pseudo random number generators include several different types of algorithms that are well known to those of skill in the art. An example of a pseudo random number generator is pseudo random number=(multiplier×seed)+adder.

According to the present invention, the pseudo random number generator uses a seed value that is based in part on the current date and time. Thus, each time the pseudo random number generates a different random number sequence, because the seed values are based on a different date or time. This feature of the present invention allows the pseudo random number generator to generate a unique number sequence each time the algorithm is run. The seed value can also be a specific pattern or code that is based on a logical block address where the test data pattern is to be stored on DUT 204.

According to another embodiment, the seed value used by the pseudo random number generator includes a code that is stored in a database. The code is linked to the date and the time that the number sequence is generated.

At step 152, system 200 writes data patterns generated by the pseudo random number generator onto DUT 204 (e.g., a magnetic or optical disk). Each data pattern that is written onto DUT 204 is unique, because the seed used to generate each data pattern is unique. As stated above, each seed is unique, because each seed is based on a current date and time, which are constantly changing.

The data patterns are written onto DUT 204 in a sector that corresponds to a particular logical block address (LBA). Each sector on a magnetic disk has a unique LBA.

If the data storage system successfully writes the data patterns onto DUT 204, system 200 stores the identical data patterns to a second memory device (i.e., reference drive 203) at step 153. Each data pattern is stored in reference drive 203 at a location corresponding to the same logical block addresses (LBAs) where the data pattern was stored on DUT 204.

The reference drive 203 can be any type of memory device or memory circuit. For example, reference drive 203 can be EEPROM, SRAM, an optical disk, magnetic tape, a magnetic disk, etc.

System 200 automatically writes the data pattern to the corresponding LBA on reference drive 203. The reference drive 203 should contain as much memory space as DUT 204. Reference drive 203 can have less memory space than DUT 204, for testing less than the total size of DUT 204.

After system 200 performs steps 151–153 as discussed above, steps 161–163 are performed to verify that the data storage system under test wrote the correct data patterns onto DUT 204.

At step 161, system 200 reads the test data from DUT 204 that was stored at step 152. System 200 reads the test data at the LBAs for each sector to be tested. At step 162, system 200 reads the data patterns stored on reference drive 203 at the corresponding logical block addresses read from DUT 204. The data patterns read from reference drive 203 are the expected values.

At step 163, system 200 compares the expected values to the data patterns read from DUT 204 for each corresponding LBA. If the data patterns read from DUT 204 match the expected data, system 200 determines that the data storage system is correctly writing data onto DUT 204. However, if some of the data patterns read from DUT 204 do not match the expected data, system 200 determines that the data storage system is not correctly writing data onto DUT 204.

When reading data from DUT 204, HBA 202 automatically reads (built into the ASIC hardware) the corresponding LBAs on reference drive 203 and compares the data received from both drives. The date/time stamp is generated by hardware in HBA 202, which is pre-pended to every sector's data, as discussed above.

According to the present invention, each test data pattern is unique, because a pseudo random number generator generates each test data pattern based on the current date and time. The current date and time change each time the pseudo random number generator generates a new test data pattern.

As test data patterns are written onto DUT 204 during step 152, the same LBA block on DUT 204 can be written and re-written several times during the test process. By writing a unique test data pattern on each sector of DUT 204, the present invention can distinguish between each writing event. It is necessary to distinguish between each writing event to verify that the data storage system has written the correct data pattern onto to DUT 204.

This feature of the present invention increases the accuracy of the testing process. In the present invention, if the expected data does not match the test data patterns read from DUT 204, there is high probability that the data storage system wrote the wrong data patterns onto DUT 204, or the write command that was requested never occurred and what is left is data from some previous write.

A system of the present invention can overlook a certain number of write errors. The present invention can have a built-in error rate threshold level. If the error rate of the data storage system is less than the threshold level, the present invention determines that the data storage system is writing data onto DUT 204 correctly. If the error rate of the data storage system exceeds the threshold level, the present invention determines that the data storage system is non-functional.

If the data storage system is not functional, the data storage system can be debugged before it is mass produced. Therefore, the present invention is highly useful for screening data storage systems that contain defects before they are released to production. The present invention reduces the costs associated with producing and operating data storage systems that have a high error rate.

According to another embodiment of the present invention, the data patterns generated by the pseudo random number generator are not stored in reference drive 203. Instead, the seed values are stored in reference drive 203 at corresponding LBAs. Subsequently, the data storage system reads the seed values from reference drive 203, and the pseudo random number generator regenerates the data patterns based on the seed values read from drive 203. The regenerated data patterns are then compared to the data patterns read from DUT 204 to evaluate the integrity of the data written onto DUT 204.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for verifying data written onto a first memory device by a data storage system, the method comprising:
   at a first time, generating a first sequence of numbers based on a first seed value using a pseudo random number generator, the first seed value including a first time sensitive code based on the first time;

writing the first sequence of numbers on the first memory device at a first location and a second memory device using the data storage system;

reading first sets of data stored on the first memory device at the first location and the second memory device;

comparing the first set of data read from the first memory device to the first set of data read from the second memory device to evaluate integrity of the first set of data written onto the first memory device;

at a second time, generating a second sequence of numbers based on a second seed value using the pseudo random generator, the second seed value including a second time sensitive code based on the second time;

writing the second sequence of numbers on the first memory device at the first location and a second memory device using the data storage system;

reading second sets of data stored on the first memory device at the first location and the second memory device; and comparing the second set of data read from the first memory device to the second set of data read from the second memory device to evaluate integrity of the first set of data written onto the first memory device.

2. The method according to claim 1 wherein writing the first and second sequences of numbers on the first memory device at the first location further comprises:

writing the first and second sequences of numbers onto the first memory device at a logical block address.

3. The method according to claim 2 wherein writing the first and second sequences of numbers on the second memory device further comprises:

storing the first and second sequences of numbers on the second memory device at the logical block address.

4. The method according to claim 3 wherein reading the data stored on the first memory device at the first location using the data storage system further comprises:

reading the data stored at the logical block address.

5. The method according to claim 2 wherein the first seed value includes the logic block address.

6. The method according to claim 1 wherein the first time sensitive code includes a date and a time that the sequence of numbers was generated.

7. The method according to claim 1 wherein the first memory device is a magnetic hard disk and the data storage system is a hard disk drive.

8. The method according to claim 1 wherein the first memory device is an optical disk and the data storage system is an optical disk drive.

9. The method according to claim 1 wherein the first time sensitive code is stored in a database and is linked to a date and a time.

10. A data storage system comprising:

a pseudo random number generator that generates a sequence of numbers based on a seed value that includes an event sensitive code; and a controller for the data storage system that writes the sequence of numbers on a memory device under test, wherein the controller reads the sequence of number stored on the memory device under test, and compares the sequence of numbers to expect data to determine if the data storage system is functioning properly, the expected data being generated from data stored on a second memory device, logic adapted to:

direct the generator to generate a plurality of sequences of numbers, each sequence based on a different seed that includes an event sensitive code; and direct the controller to write, at different times, each sequence to the same location on the memory device under test, and to compare each sequence to data stored on a second memory device.

11. The data storage system according to claim 10 wherein the controller writes one sequence of numbers on the second memory device, the controller reads the one sequence of numbers stored on the second memory device, and the expected data is the one sequence of numbers read from the second memory device.

12. The data storage system according to claim 10 wherein the controller writes one seed value on the second memory device, the pseudo random number generator regenerates one sequence of numbers based on the one seed value stored on the second memory device, and the regenerated sequence of numbers is the expected data.

13. The data storage system according to claim 10 wherein the memory device under test is a magnetic hard disk drive and the controller is a hard disk drive controller.

14. The data storage system according to claim 10 wherein the event sensitive code includes a date and a time.

15. The data storage system according to claim 14 wherein one seed value includes a logic block address corresponding to the location where the controller writes one sequence of numbers on the memory device under test.

16. The data storage system according to claim 10 wherein the controller writes one sequence of numbers on the memory device under test at a logical block address and on the reference drive at the corresponding logical block address.

17. The data storage system according to claim 16 wherein the controller reads one sequence of numbers stored on the memory device under test at the logical block address.

18. The method according to claim 10 wherein the memory device under test is an optical disk and the data storage system is an optical disk drive.

19. The method according to claim 10 wherein the event sensitive code is stored in a database and is linked to a date and a time.

20. A method for verifying data written onto a memory device under test by a data storage system, the method comprising:

at a first date and time, generating a first sequence of numbers based on a first seed value using a pseudo random number generator, the first seed value including the first date and a time;

writing the first sequence of numbers on the memory device under test at a first location using the data storage system;

storing the first seed value in a second memory device;

regenerating the first sequence of numbers based on the first seed value stored in the second memory device using the pseudo random number generator;

reading the first sequence of numbers stored on the memory device under test at the first location; and comparing the regenerated first sequence of numbers to the first sequence of numbers read from the memory device under test at the first location to determine an integrity of data written onto the memory device under test, at a second date and time, generating a second sequence of numbers based on a second seed value using the pseudo random number generator, the second seed value including the second date and a time;

writing the second sequence of numbers on the memory device under test at the first location using the data storage system;

storing the second seed value in the second memory device;

regenerating the second sequence of numbers based on the second seed value stored in the second memory device using the pseudo random number generator;

reading the second sequence of numbers stored on the memory device under test at the first location; and comparing the regenerated second sequence of numbers to the second sequence of numbers read from the memory device under test at the first location to determine an integrity of data written onto the memory device under test.

21. The method according to claim 1, further comprising:

comparing data written to a plurality of additional locations on the first memory device to corresponding data written on the second memory device; and if the number of locations having error is below a threshold, then determining that the data has been written correctly.

* * * * *